US012211361B2

(12) United States Patent
Shinoda et al.

(10) Patent No.: US 12,211,361 B2
(45) Date of Patent: Jan. 28, 2025

(54) ACTIVITY SUPPORT APPARATUS, ACTIVITY SUPPORT METHOD, AND COMPUTER READABLE RECORDING MEDIUM

(71) Applicant: NEC Corporation, Tokyo (JP)

(72) Inventors: Shigeki Shinoda, Tokyo (JP); Yoshihiro Sato, Tokyo (JP); Shin Tominaga, Tokyo (JP); Daisuke Ikefuji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/909,842

(22) PCT Filed: Mar. 18, 2020

(86) PCT No.: PCT/JP2020/011960
§ 371 (c)(1),
(2) Date: Sep. 7, 2022

(87) PCT Pub. No.: WO2021/186611
PCT Pub. Date: Sep. 23, 2021

(65) Prior Publication Data
US 2024/0212470 A1 Jun. 27, 2024

(51) Int. Cl.
*G08B 21/02* (2006.01)
*G08B 21/18* (2006.01)

(52) U.S. Cl.
CPC ........... *G08B 21/02* (2013.01); *G08B 21/182* (2013.01)

(58) Field of Classification Search
None
See application file for complete search history.

(56) References Cited

U.S. PATENT DOCUMENTS

| | | | | |
|---|---|---|---|---|
| 6,118,382 A * | 9/2000 | Hibbs | A62B 9/00 340/584 |
| 10,885,759 B1 * | 1/2021 | Lee | G08B 21/0446 |
| 2018/0254096 A1 * | 9/2018 | Karunanithi | G06Q 10/0639 |

FOREIGN PATENT DOCUMENTS

| | | |
|---|---|---|
| JP | 2009-193564 A | 6/2009 |
| JP | 2013-157022 A | 8/2013 |
| JP | 2018-116584 A | 7/2018 |
| JP | 2019-049867 A | 3/2019 |
| JP | 2019-185386 A | 10/2019 |

OTHER PUBLICATIONS

International Search Report for PCT Application No. PCT/JP2020/011960, mailed on Sep. 8, 2020.
English translation of Written opinion for PCT Application No. PCT/JP2020/011960, mailed on Sep. 8, 2020.

* cited by examiner

*Primary Examiner* — Thomas S McCormack
(74) *Attorney, Agent, or Firm* — Sughrue Mion, PLLC

(57) ABSTRACT

An activity support apparatus supports an activity of a worker at a disaster site. The activity support apparatus comprises a vibration data acquisition unit that acquires vibration data of vibrations generated by the worker, an activity level estimation unit that estimates an activity level of the worker based on the vibration data acquired by the vibration data acquisition unit, and a notification unit that notifies the activity level estimated by the activity level estimation unit.

15 Claims, 7 Drawing Sheets

Fig.4

| | | Temperature | | | |
|---|---|---|---|---|---|
| | | 50°C | 55°C | 60°C | 65°C |
| Humidity | 70% | No Limit | 28min00sec | 14min42sec | 6min06sec |
| | 80% | 30min00sec | 21min48sec | 7min30sec | 3min13sec |
| | 90% | 30min00sec | 15min00sec | 3min19sec | 1min30sec |

Fig.5

| | Excess Time | | | |
|---|---|---|---|---|
| | 0 min or less | 10 min | 15 min | 20 min |
| Activity Risk | No Risk | Risk A | Risk B | Risk C |

ACTIVITY SUPPORT APPARATUS, ACTIVITY SUPPORT METHOD, AND COMPUTER READABLE RECORDING MEDIUM

CROSS REFERENCE TO RELATED APPLICATIONS

This application is a National Stage of Application No. PCT/JP2020/11960 filed Mar. 18, 2020 the disclosure of which is incorporated herein in its entirety by reference.

TECHNICAL FIELD

The present invention relates to an activity support apparatus, an activity support method and a computer-readable recording medium having recorded therein a program for realizing the apparatus and the method.

BACKGROUND ART

At a disaster site, for example, a firefighting work site, a commander gives instructions to each worker by radio so that the workers can work safely and efficiently. In order to give instructions to each worker, the commander needs to know the situation of each worker. Patent document 1 discloses a system for determining whether a firefighter is performing normal activities or encountering an abnormal situation. The system described in Patent document 1 determines whether the worker is running or at a standstill based on acceleration data from two acceleration sensors worn by the worker.

LIST OF RELATED ART DOCUMENTS

Patent Document

Patent Document 1: Japanese Patent Laid-Open Publication No. 2009-193564

SUMMARY OF INVENTION

Problems to be Solved by the Invention

When an acceleration sensor is used as in Patent document 1, there is a risk that the worker's situation cannot be accurately determined. For example, if a worker is discharging water and the acceleration sensor does not detect acceleration even though the worker is working, the commander may judge that the worker is standing still (not working). Therefore, the commander may not be able to give accurate instructions to the worker.

An example of object of the present invention is to provide an activity support apparatus and an activity support method capable of grasping a situation of a worker at a disaster site and a computer-readable recording medium having recorded therein a program for realizing the apparatus and the method.

Means for Solving the Problems

In order to achieve the above object, an activity support apparatus in one aspect of the present invention is an activity support apparatus that supports an activity of a worker at a disaster site, the activity support apparatus includes:

a vibration data acquisition unit that acquires vibration data of vibrations generated by the worker, an activity level estimation unit that estimates an activity level of the worker based on the vibration data acquired, and a notification unit that notifies the activity level estimated.

Further, in order to achieve the above object, an activity support method in one aspect of the present invention is an activity support method that supports an activity of a worker at a disaster site, the activity support method includes:

a step of acquiring vibration data of vibrations generated by the worker, a step of estimating an activity level of the worker based on the vibration data acquired, and a step of notifying the activity level estimated.

Further, in order to achieve the above object, a computer-readable recording medium in one aspect of the present invention is a computer-readable recording medium includes a program, which allows a computer to support an activity of a worker at a disaster site, recorded thereon, the program including instructions that cause a computer to execute:

a step of acquiring vibration data of vibrations generated by the worker, a step of estimating an activity level of the worker based on the vibration data acquired, and a step of notifying the activity level estimated.

Advantageous Effects of the Invention

According to the present invention, it is possible to grasp the situation of the worker at the disaster site.

BRIEF DESCRIPTION OF THE DRAWINGS

FIG. 4 is a diagram showing a table referred to when calculating the maximum time from site temperature and site humidity.

FIG. 5 is a table referred to when calculating activity risk.

EXAMPLE EMBODIMENTS

Hereinafter, an activity support apparatus, an activity support method, and a program according to the example embodiment of the present invention will be described with reference to FIGS. 1 to 7.

[Apparatus Configuration]

Figure 1:
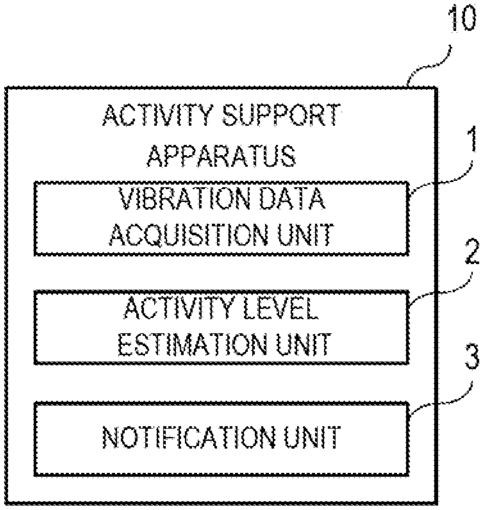
FIG. 1 is a block diagram showing a configuration of an activity support apparatus.

FIG. 1 is a block diagram showing a configuration of the activity support apparatus 10. The activity support apparatus 10 is an apparatus that supports the activities of workers at disaster sites. The activity support apparatus 10 includes a vibration data acquisition unit 1, an activity level estimation unit 2 and a notification unit 3.

The vibration data acquisition unit 1 acquires vibration data of vibrations generated by the worker.

The activity level estimation unit 2 acquires an activity of the worker based on the vibration data acquired by the vibration data acquisition unit 1. An activity level is a state such as a standstill or walking, which will be described in detail later.

The notification unit 3 notifies the activity level estimated by the activity level estimation unit 2.

The activity support apparatus 10 can determine the worker's activity level, such as a standstill or walking, from the vibration data, even when the worker is performing work that does not require significant movement. The activity level is then notified to the commander, for example, so that the commander can grasp the situation of the worker at the disaster site (e.g., whether the worker is moving or at a standstill). When a plurality of workers are at the disaster site, each worker can grasp the situation of the other workers by notifying each other.

Subsequently, a configuration of the activity support apparatus 10 will be specifically described with reference to FIGS. 2 to 6.

Figure 2:
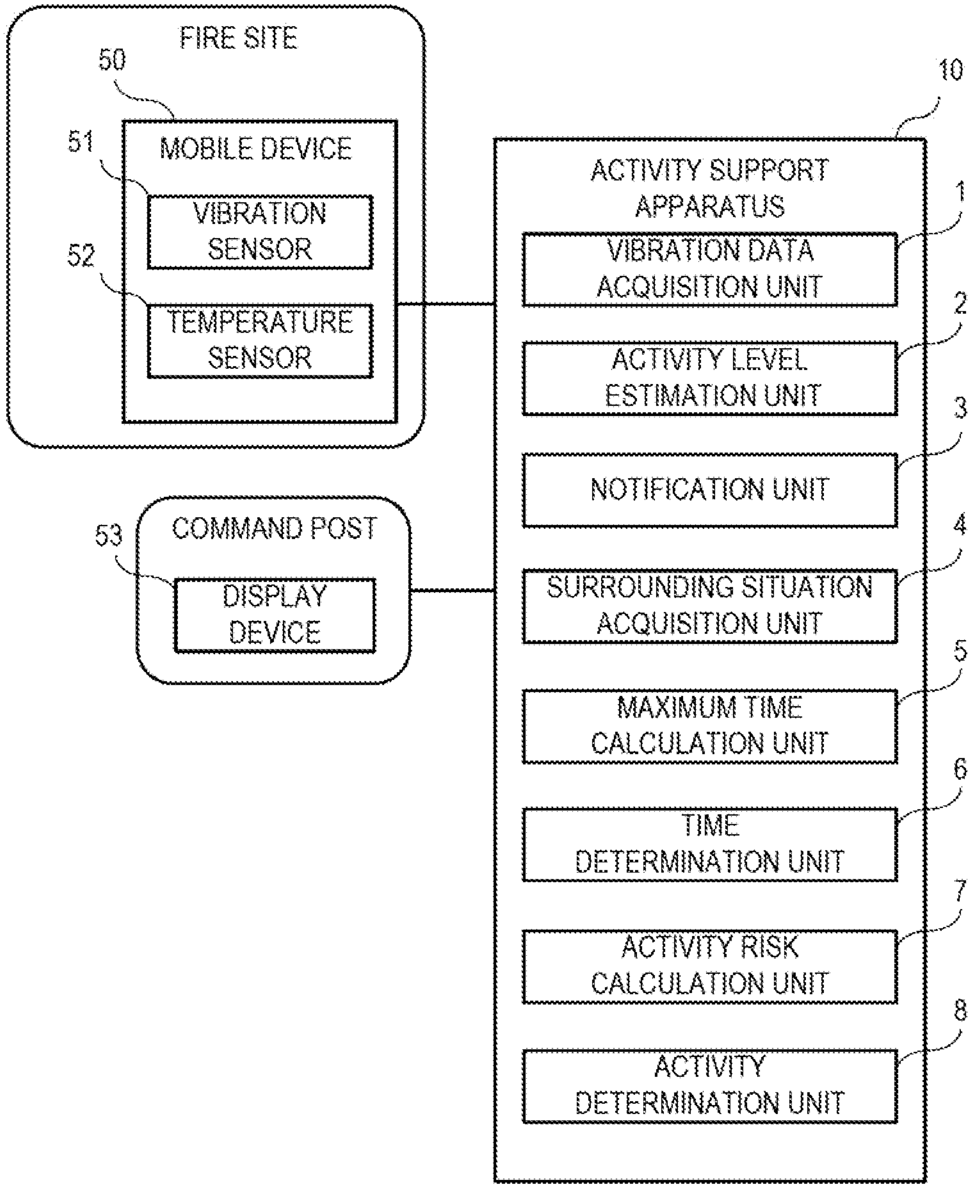
FIG. 2 is a block diagram specifically showing a configuration of the activity support apparatus.

FIG. 2 is a block diagram specifically showing a configuration of the activity support apparatus 10. In the following explanation, the disaster site is assumed to be the fire site. It is assumed that the workers are engaged in firefighting and rescue activities at the fire site, and that the commander who commands each worker gives instructions to each worker from the command post. In addition, it is assumed that the worker carries a mobile device 50 and a display device 53 is installed at the command post.

The activity support apparatus 10 can perform data communication with the mobile device 50 and the display device 53.

The mobile device 50 is, for example, a wristwatch-type wearable terminal. The mobile device 50 includes a vibration sensor 51. The vibration sensor 51 detects vibrations generated in the worker's body due to actions such as walking.

In addition, the mobile device 50 includes a temperature sensor 52. The temperature sensor 52 measures a temperature around the mobile device 50. Note that the temperature sensor 52 may be a sensor that also detects humidity. Further, the temperature sensor 52 may be a thermometer that detects a body temperature of the worker.

The display device 53 displays the data received from the activity support apparatus 10 on the screen. The display device 53 may be a general-purpose PC (personal computer), a smart phone, a tablet-type terminal device, or the like. The activity support apparatus 10 and the display device 53 may be provided integrally. Further, the activity support apparatus 10 may be provided at the same location as the display device 53, or may be provided at a separate location.

The activity support apparatus 10 includes a surrounding situation acquisition unit 4, a maximum time calculation unit 5, a time determination unit 6, an activity risk calculation unit 7 and an activity determination unit 8 in addition to the vibration data acquisition unit 1, the activity level estimation unit 2 and the notification unit 3 described above.

The vibration data acquisition unit 1 receives vibration data of the worker detected by the vibration sensor 51 from the mobile device 50.

The activity level estimation unit 2 estimates the activity level of the worker based on the feature amount of the received vibration data. The activity level is information that classifies the motion of the worker into three stages: standstill, normal motion, and abnormal motion. The "standstill" includes a state in which the worker intends to stop, and a state in which the worker stops unintentionally due to, for example, unconsciousness. The "normal motion" is general motion such as water discharge or walking. The "abnormal motion" is motion contrary to the worker's will, such as falling or tumbling, for example.

The feature amount of the vibration data includes a magnitude of vibration amplitude, a time variation of vibration amplitude, or the like. For example, a first threshold value is set based on a sample vibration of a worker generated by firefighting and rescue activities. If the vibration amplitude of the vibration data received by the vibration data acquisition unit 1 is equal to or less than the first threshold value the activity level estimation unit 2 estimates the activity level that indicates the motion of the worker is "standstill", and if the vibration amplitude of the vibration data is greater than the first threshold value, the activity level estimation unit 2 estimates the activity level that indicates the motion of the worker is "normal motion" or "abnormal motion".

In addition, a second threshold value is set based on a vibration that cannot be generated during firefighting or rescue activities, such as a vibration due to impact when falling. In the case where the activity level indicating that the motion of the worker is "normal motion" or "abnormal motion" is estimated, if the vibration amplitude of the received vibration data is equal to or less than the second threshold value, the activity level estimation unit 2 estimates the activity level that indicates the motion of the worker is "normal motion", and if the vibration amplitude of the received vibration data is greater than the second threshold value, the activity level estimation unit 2 estimates the activity level that indicates the motion of the worker is "abnormal motion".

Note that the above is an example of the method of estimating the activity level by the activity level estimation unit 2. In addition to the above, the activity level estimation unit 2 may estimate the activity level based on the similarity of vibration waveforms by contrasting the sample vibration and the received vibration data. Further, the activity level may be defined by classifying into multiple stages according to the vibration amplitude value of the received vibration data. For example, the vibration amplitude values are classified into level 1, level 2, and level 3 in ascending order. Then, in the case of the activity level is level 1, the worker may be assumed to be at a standstill, and in the case of activity level is level 3, the worker may be assumed to be running.

The surrounding situation acquisition unit 4 acquires a surrounding situation of the fire site where the worker is located. The surrounding situation acquisition unit 4 receives temperature data of the temperature measured by the temperature sensor 52 (hereinafter referred to as "site temperature") from the mobile device 50 as the surrounding situation. Note that if the temperature sensor 52 is a thermometer that detects the body temperature of the worker, the surrounding situation acquisition unit 4 may receive the body temperature of the worker as the surrounding situation. The surrounding situation acquisition unit 4 may then estimate the site temperature from the body temperature of the worker and acquire that as the surrounding situation.

The maximum time calculation unit 5 calculates a maximum time that the worker is allowed to work at the disaster site from the surrounding situation acquired by the surrounding situation acquisition unit 4. The "maximum time" is the maximum amount of time the worker can safely work. In this embodiment, the maximum time is calculated from the site temperature. The maximum time calculation unit 5 calculates the maximum time to be short when the site temperature is high, assuming that a radiant heat at the fire site is high and a fire is strong. On the other hand, when the site temperature is low, the maximum time calculation unit 5 calculates a longer maximum time when the site temperature is low, assuming that a fire is weak. The maximum time calculation unit 5 calculates the maximum time according to the settings shown in FIG. 3, for example.

Figure 3:
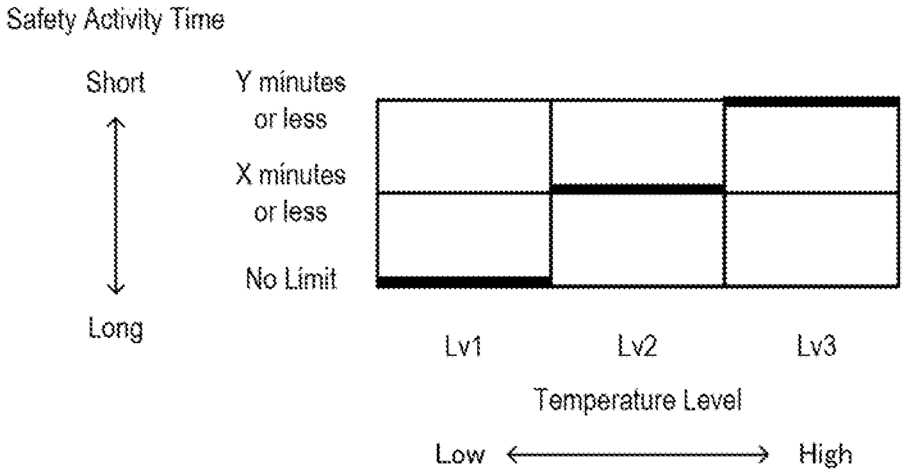
FIG. 3 is a diagram showing an example of settings used to calculate a maximum time for safe activity.

FIG. 3 is a diagram showing an example of settings used to calculate the maximum time for safe activity.

In the setting shown in FIG. 3, the site temperature is divided into three temperature levels, Lv1, Lv2, and Lv3. Each temperature level has a maximum time for safe activity. For example, when the site temperature is classified as Lv1, the maximum time calculation unit 5 calculates the maximum time to "No Limit". Further, when the site temperature is classified as Lv2, the maximum time calculation unit 5 calculates the maximum time to "X minutes".

Note that if the temperature sensor 52 is a sensor that also detects humidity, the surrounding situation acquisition unit 4 also receives humidity (hereinafter referred to as site humidity) from the mobile device 50, and the maximum time calculation unit 5 may calculate the maximum time from the site temperature and the site humidity. In this case, the maximum time calculation unit 5 calculates the maximum time by referring to the table shown in FIG. 4, for example.

FIG. 4 is a diagram showing a table referred to when calculating the maximum time from the site temperature and the site humidity.

For example, when the site temperature is "50° C." and the site humidity is "70%", the maximum time calculation unit 5 calculates the maximum time to "No Limit". Further, when the site temperature is "65° C." and the site humidity is "80%", the maximum time calculation unit 5 calculates the maximum time to "3 minutes and 13 seconds". Note that the temperature and humidity in FIG. 4 are an example.

Further, the maximum time calculation unit 5 may calculate the maximum time in consideration of the activity level of the worker, biological information of the worker, or the like. For example, if the activity level indicating that the motion of the worker is "standstill" continues for a long time, the maximum time calculation unit 5 reduces the maximum time calculated from FIG. 3 or FIG. 4 to a shorter time because the worker may have fallen. Alternatively, if the activity 30 level indicating that the motion of the worker is "abnormal motion", the maximum time calculation unit 5 reduces the maximum time calculated from FIG. 3 or FIG. 4 to a shorter time, assuming that the worker may be involved in an accident at the disaster site. Further, in the case of receiving the body temperature or an amount of perspiration of the worker from the mobile device 50, if the body temperature is high or the amount of perspiration is large, the maximum time calculation unit reduces the maximum time calculated from FIG. 3 or FIG. 4 to a shorter time, assuming that the worker is in danger.

Furthermore, the maximum time calculation unit 5 may calculate the maximum time by taking into account a remaining amount of air in an air respirator (cylinder) carried by the worker. In this case, the maximum time calculation unit 5 acquires the remaining amount of air directly from the air respirator or via the mobile device 50. If the acquired remaining amount of air is 40% or less, the maximum time calculation unit 5 reduces the maximum time calculated from FIG. 3 or FIG. 4 to a shorter time, assuming that the remaining amount of air is not sufficient even if the site temperature is low:

Alternatively, the maximum time calculation unit 5 may calculate the maximum time by considering the surrounding situation acquired by the surrounding situation acquisition unit 4, such as a presence of chemical substances at the fire site. When chemical substances are present at the disaster site, the risk increases when the site temperature approaches an ignition or reaction temperature of the chemical substance, a melting temperature of a container, or the like. Therefore, the maximum time calculation unit 5 takes into account the situation when the temperature rise occurs even if the site temperature is low, and reduces the maximum time calculated from FIG. 3 or FIG. 4 to a shorter time.

Return to FIG. 2. The time determination unit 6 determines whether the surrounding situation acquisition unit 4 continues to acquire a temperature equal to or higher than a temperature used by the maximum time calculation unit 5 to calculate the maximum time for a period longer than the maximum time. The time that the surrounding situation acquisition unit 4 continues to acquire the temperature equal to or higher than the temperature used to calculate the maximum time is the time that the worker continues to work at the same fire site (hereinafter referred to as activity time). Therefore, the time determination unit 6 determines whether the activity time exceeds the maximum time.

The activity risk calculation unit 7 calculates an activity risk from the determination result of the time determination unit 6. The activity risk is the risk caused by worker working at the same fire site for a long period of time. For example, there is a risk of burns, heat stroke, etc., if the worker works at the same fire site for more than the maximum time. The activity risk calculation unit 7 calculates the activity risk by referring to the table shown in FIG. 5, for example.

FIG. 5 is a table referred to when calculating activity risk. The activity risk calculation unit 7 calculates the time that the activity time exceeds the maximum time (hereinafter referred to as excess time). In the table shown in FIG. 5, the activity risk is set according to the excess time. Referring to this table, the activity risk calculation unit 7 calculates "Risk A" as the activity risk if the excess time is "10 minutes" and calculates "Risk B" as the activity risk if the excess time is "15 minutes". If the excess time is "0 minutes or less", that is, the activity time is less than or equal to the maximum time, the activity risk calculation unit 7 calculates "No Risk".

Note that the activity risk calculation unit 7 may calculate the activity risk by making a binary determination as to whether the activity time exceeds the maximum time. In other words, the activity risk calculation unit 7 calculates "No Risk" if the activity time is less than or equal to the maximum time and calculate a preset content as the activity risk if the activity time exceeds the excess time.

In addition, the activity risk calculation unit 7 may calculate the activity risk by taking into account the remaining amount of air in the air respirator carried by the worker. In this case, the activity risk calculation unit 7 calculates the activity risk if the remaining amount of air 50% or less, assuming that the remaining amount of air is not sufficient even if the activity time is less than or equal to the maximum time.

Furthermore, the activity risk calculation unit 7 may calculate the activity risk based on the situation at the fire site, such as the presence of chemicals at the site. In this case, the activity risk calculation unit 7 calculates the activity risk as the risk increases when the site temperature approaches the ignition or reaction temperature of the chemical substance, the melting temperature of the container, or the like, even if the activity time is less than or equal to the maximum time.

Return to FIG. 2. The activity determination unit 8 determines whether the worker is performing normal activity based on the activity level estimated by the activity level estimation unit 2 and the activity risk calculated by the activity risk calculation unit 7. For example, if the activity estimation unit 2 estimates that the motion of the worker is "standstill" or "abnormal motion" as the activity level and the activity risk calculation unit 7 calculates "risk of heatstroke" as the activity risk, the activity determination unit 8 determines that the worker has fallen and is not performing normal activity. If the activity estimation unit 2 estimates that the motion of the worker is "normal motion" as the activity level, the activity determination unit 8 determines that the worker is performing normal activity, regardless of the activity risk.

The notification unit 3 notifies the activity level estimated by the activity estimation unit 2. In this case, the notification unit 3 transmits the estimated activity level to the display device 53. The display device 53 notifies the commander of the activity level of the worker by text, voice, or the like. This allows the commander to grasp whether the worker is at a standstill or moving, at the fire site.

The notification unit 3 may notify the maximum time calculated by the maximum time calculation unit 5 together with the activity level. In this case, the notification unit 3 transmits the calculated maximum time to the display device 53. The display device 53 notifies the commander of the maximum time that the worker can safely work by means of text, voice, or the like. This allows the commander to issue appropriate instructions, such as withdrawal instructions, that take the safety of the worker into consideration.

In addition, the notification unit 3 notifies the determination result of the normal activity by the activity determination unit 8. The notification unit 3 transmits the determination result by the activity determination unit 8 to the display device 53. The display device 53 notifies the commander of information such as whether the worker is carrying out normal activity at the disaster site or the worker is not carrying out normal activity by text, voice, or the like. As a result, the commander can grasp the worker's situation, which cannot be determined only from the activity level, such as whether the worker is intentionally stopped or incapacitated.

In the example embodiment, the surrounding situation acquired by the surrounding situation acquisition unit 4 is the temperature. However, if the mobile device 50 includes an imaging device, the surrounding situation acquiring unit 4 may receive image data captured by the imaging device as the surrounding situation. In this case, the maximum time calculating unit 5 calculates the maximum time by grasping the situation of the fire site by image processing the received image data. Furthermore, acceleration data may be received from the activity support apparatus 10 and the activity level of the worker may be estimated using the vibration data and the acceleration data.

[Apparatus Operations]

Figure 6:
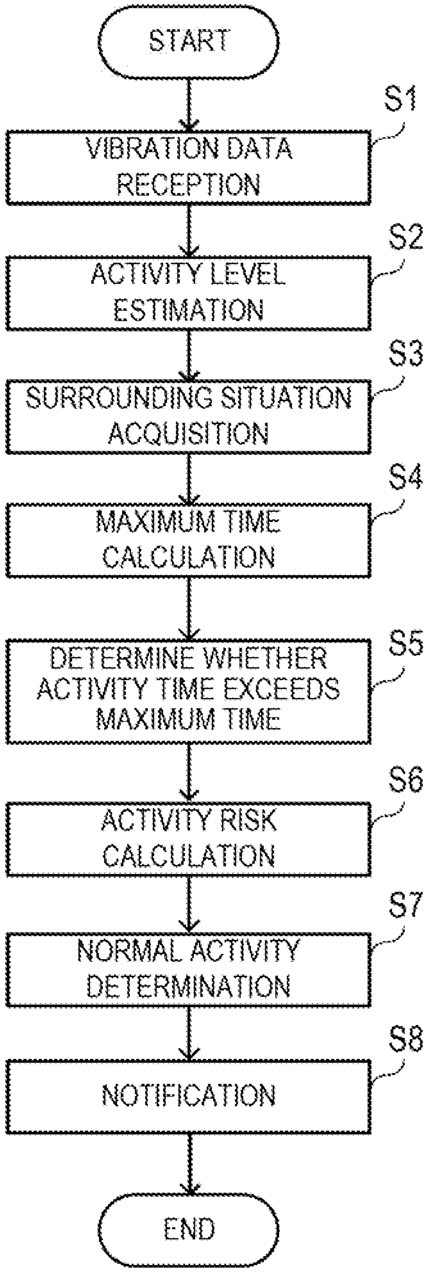
FIG. 6 is a flow diagram showing an operation of the activity support apparatus.

Next, the operation of the activity support apparatus 10 in the example embodiment will be described with reference to FIG. 6. FIG. 6 is a flow diagram showing the operation of the activity support apparatus 10 according to the example embodiment. In the example embodiment, the activity support method is implemented by operating the activity support apparatus 10. Therefore, the description of the activity support method in the example embodiment will be replaced with the following description of the operation of the activity support apparatus 10.

The vibration data acquisition unit 1 receives the vibration data of the worker detected by the vibration sensor 51 from the mobile device 50 (S1). The activity level estimation unit 2 estimates the activity level of the worker based on the vibration data (S2). The activity level estimation unit 2 estimates the activity level that indicates the motion of the worker is "standstill", "normal motion" or "abnormal motion".

The surrounding situation acquisition unit 4 acquires the surrounding situation of the fire site where the worker is located (S3). In the example embodiment, the surrounding situation acquisition unit 4 receives the temperature data of the temperature measured by the temperature sensor 51 from the mobile device 50 as the surrounding situation.

The maximum time calculation unit 5 calculates the maximum time that the worker is allowed to work at the disaster site (S4). The maximum time calculation unit 5 calculates the maximum time that the worker is allowed to work at the disaster site from the site temperature acquired by the surrounding situation acquisition unit 4, with reference to the table shown in FIG. 3, for example.

Next, the time determination unit 6 determines whether the activity time exceeds the maximum time (S5). The activity risk calculation unit 7 calculates the activity risk from the determination result in S5(S6). The activity risk calculation unit 7 calculates the activity risk by referring to the table shown in FIG. 5, for example.

The activity determination unit 8 determines whether the worker is performing normal activity based on the activity level estimated in S2 and the activity risk calculated in S6 (S7). Then, the notification unit 3 notifies the activity level estimated in S2, the maximum time calculated in S4, and the determination result in S8 (S8). The notification unit 3 transmits the activity level estimated in S2, the maximum time calculated in S4, and the determination result in S8 to the display device 53, for example. The display device 53 notifies the activity level estimated in S2, the maximum time calculated in S4, and the determination result in S7 by text, voice, or the like.

In the above explanation, the disaster site is a fire site, but it may be another disaster site such as a site where a building collapsed due to an earthquake or a site where a gas leak occurred.

Program

It is sufficient for the program according to the example embodiment to be a program that causes a computer to execute each step shown in FIG. 6. The activity support apparatus 10 and the activity support method according to the example embodiment can be realized by installing this program in the computer and executing this program. In this case, a processor of the computer functions as the vibration data acquisition unit 1, the activity level estimation unit 2, the notification unit 3, the surrounding situation acquisition unit 4, the maximum time calculation unit 5, the time determination unit 6, the activity risk calculation unit 7, and the activity determination unit 8, and performs processing.

Also, the program according to the example embodiment may be executed by a computer system constituted by a plurality of computers. In this case, for example, each computer may function as any of the vibration data acquisition unit 1, the activity level estimation unit 2, the notification unit 3, the surrounding situation acquisition unit 4, the maximum time calculation unit 5, the time determination unit 6, the activity risk calculation unit 7, and the activity determination unit 8.

In addition to general-purpose PCs, smart phones and tablet-type terminal devices are examples of computers.

Effect in the Example Embodiment

The activity support apparatus 10 determines the activity level of the worker, such as a standing still or walking, from the vibration data, so that the commander can grasp the situation of the worker at the disaster site (e.g., whether the worker is moving or at a standstill). Further, the activity support apparatus 10 calculates the maximum time for safe activity, so that the commander can issue instructions, such as withdrawal instructions, in consideration of worker safety, according to the maximum time. In addition, the workers can carry out activities in consideration of their own safety.

Furthermore, the activity support apparatus 10 calculates the activity risk, so that the commander can issue instructions in consideration of worker safety. In addition, the activity support apparatus 10 determines whether the worker is performing normal activity, so that the commander can grasp whether the worker is intentionally stopped or incapacitated.

[Physical configuration]

Figure 7:
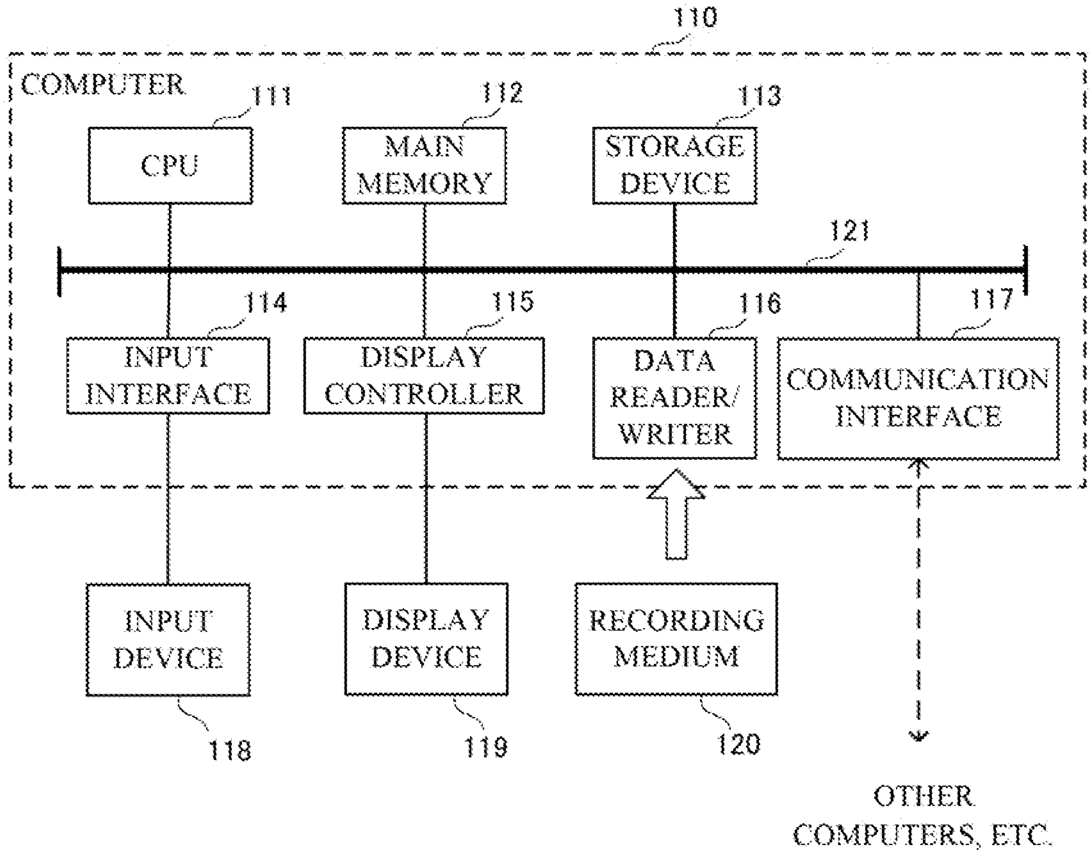
FIG. 7 is a block diagram showing an example of a computer that realizes the activity support apparatus according to the example embodiment.

Here, a computer that realizes the activity support apparatus by executing the program in the example embodiment will be described with reference to FIG. 7. FIG. 7 is a block diagram illustrating one example of a computer realizing the activity support apparatus in the example embodiment.

As illustrated in FIG. 7, a computer 110 includes a CPU 111, a main memory 112, a storage device 113, an input interface 114, a display controller 115, a data reader/writer 116, and a communication interface 117. These components are connected via a bus 121 so as to be capable of performing data communication with one another. Note that the computer 110 may include a GPU (Graphics Processing Unit) or a FPGA (Field-Programmable Gate Array) in addition to the CPU 111 or in place of the CPU 111.

The CPU 111 loads the program (codes) in the example embodiment, which is stored in the storage device 113, onto the main memory 112, and performs various computations by executing these codes in a predetermined order. The main memory 112 is typically a volatile storage device such as a DRAM (Dynamic Random Access Memory). Furthermore, the program in the example embodiment is provided in a state such that the program is stored in a computer readable recording medium 120. Note that the program in the example embodiment may also be program that is distributed on the Internet, to which the computer 110 is connected via the communication interface 117.

In addition, specific examples of the storage device 113 include semiconductor storage devices such as a flash memory, in addition to hard disk drives. The input interface 114 mediates data transmission between the CPU 111 and input equipment 118 such as a keyboard and a mouse. The display controller 115 is connected to a display device 119, and controls the display performed by the display device 119.

The data reader/writer 116 mediates data transmission between the CPU 111 and the recording medium 120, and executes the reading out of the program from the recording medium 120 and the writing of results of processing in the computer 110 to the recording medium 120. The communication interface 117 mediates data transmission between the CPU 111 and other computers.

Furthermore, specific examples of the recording medium 120 include a general-purpose semiconductor storage device such as a CF (Compact Flash: registered trademark) card or a SD (Secure Digital) card, a magnetic recording medium such as a flexible disk, and an optical recording medium such as a CD-ROM (Compact Disk Read Only Memory).

Note that the activity support apparatus in the example embodiment can also be realized by using pieces of hardware corresponding to the respective units, rather than using a computer on which the program is installed. Furthermore, a portion of the activity support apparatus may be realized by using a program, and the remaining portion of the activity support apparatus may be realized by using hardware.

While a part of or the entirety of the above-described example embodiment can be expressed by (Supplementary note 1) to (Supplementary note 18) described in the following, the invention is not limited to the following description.

Supplementary Note 1

An activity support apparatus that supports an activity of a worker at a disaster site, the activity support apparatus including:

a vibration data acquisition unit that acquires vibration data of vibrations generated by the worker, an activity level estimation unit that estimates an activity level of the worker based on the vibration data acquired, and a notification unit that notifies the activity level estimated.

Supplementary Note 2

The activity support apparatus according to Supplementary note 1, wherein the activity level estimation unit estimates the activity level from a feature amount of the vibration data.

Supplementary Note 3

The activity support apparatus according to Supplementary note 1 or 2, further including:

a surrounding situation acquisition unit that acquires a surrounding situation of the worker, and a maximum time calculation unit that calculates a maximum time that the worker is allowed to work at the disaster site from the surrounding situation, wherein the notification unit notifies the maximum time and the activity level.

Supplementary Note 4

The activity support apparatus according to Supplementary note 3, wherein the surrounding situation acquisition unit acquires a temperature around the worker as the surrounding situation, the maximum time calculation unit calculates the maximum time from the temperature acquired.

Supplementary Note 5

The activity support apparatus according to Supplementary note 4, further including:

a time determination unit that determines whether the surrounding situation acquisition unit continues to acquire a temperature equal to or higher than a temperature used to calculate the maximum time for a period longer than the maximum time, and an activity risk calculation unit that calculates an activity risk based on a result of a determination, wherein
the notification unit notifies the activity risk.

Supplementary Note 6

The activity support apparatus according to Supplementary note 4 or 5, further including:
an activity determination unit that determines whether the worker is performing a normal activity from the activity level and the activity risk, wherein
the notification unit notifies a determination result of the normal activity.

Supplementary Note 7

An activity support method that supports an activity of a worker at a disaster site,
the activity support method including:
a step of acquiring vibration data of vibrations generated by the worker,
a step of estimating an activity level of the worker based on the vibration data acquired, and
a step of notifying the activity level estimated.

Supplementary Note 8

The activity support method according to Supplementary note 7, wherein in the step of estimating the activity level, estimating the activity level from a feature amount of the vibration data.

Supplementary Note 9

The activity support method according to Supplementary note 7 or 8, further including:
a step of acquiring a surrounding situation of the worker, and
a step of calculating a maximum time that the worker is allowed to work at the disaster site from the surrounding situation, wherein
in the step of notifying the activity level, notifying the maximum time and the activity level.

Supplementary Note 10

The activity support method according to Supplementary note 9, wherein in the step of acquiring the surrounding situation, acquiring a temperature around the worker as the surrounding situation, and in the step of calculating the maximum time, calculating the maximum time from the temperature acquired.

Supplementary Note 11

The activity support method according to Supplementary note 10, further including:
a step of determining whether a temperature equal to or higher than a temperature used to calculate the maximum time continues to be acquired for a period longer than the maximum time, and
a step of calculating an activity risk based on a result of a determination, wherein
in the step of notifying the activity level, notifying the activity risk.

Supplementary Note 12

The activity support method according to Supplementary note 10 or 11, further including:
a step of determining whether the worker is performing a normal activity from the activity level and the activity risk, wherein
in the step of notifying the activity level, notifying a determination result of the normal activity.

Supplementary Note 13

A computer-readable recording medium that includes a program, which allows a computer to support an activity of a worker at a disaster site, recorded thereon,
the program including instructions that cause a computer to execute:
a step of acquiring vibration data of vibrations generated by the worker,
a step of estimating an activity level of the worker based on the vibration data acquired, and
a step of notifying the activity level estimated.

Supplementary Note 14

The computer-readable recording medium according to Supplementary note 13, wherein
in the step of estimating the activity level, estimating the activity level from a feature amount of the vibration data.

Supplementary Note 15

The computer-readable recording medium according to Supplementary note 13 or 14, the program further including instructions that cause a computer to execute:
a step of acquiring a surrounding situation of the worker, and
a step of calculating a maximum time that the worker is allowed to work at the disaster site from the surrounding situation, wherein
in the step of notifying the activity level, notifying the maximum time and the activity level.

Supplementary Note 16

The computer-readable recording medium according to any one of Supplementary note 15, wherein
in the step of acquiring the surrounding situation, acquiring a temperature around the worker as the surrounding situation, and
in the step of calculating the maximum time, calculating the maximum time from the temperature acquired.

Supplementary Note 17

The computer-readable recording medium according to Supplementary note 16, the program further including instructions that cause a computer to execute:
a step of determining whether a temperature equal to or higher than a temperature used to calculate the maximum time continues to be acquired for a period longer than the maximum time, and
a step of calculating an activity risk based on a result of a determination, wherein
in the step of notifying the activity level, notifying the activity risk.

Supplementary Note 18

The computer-readable recording medium according to Supplementary note 16 or 17, the program further including instructions that cause a computer to execute:

a step of determining whether the worker is performing a normal activity from the activity level and the activity risk, wherein in the step of notifying the activity level, notifying a determination result of the normal activity.

The invention has been described with reference to the example embodiment above, but the invention is not limited to the above-described example embodiment. Within the scope of the invention, various changes that could be understood by a person skilled in the art could be applied to the configurations and details of the invention.

REFERENCE SIGNS LIST

1 Vibration data acquisition unit
2 Activity level estimation unit
3 Notification unit
4 Surrounding situation acquisition unit
5 Maximum time calculation unit
6 Time determination unit
7 Activity risk calculation unit
8 Activity determination unit
10 Activity support apparatus
50 Mobile device
51 Vibration sensor
52 Temperature sensor
53 Display device
110 Computer
111 CPU
112 Main memory
113 Storage device
114 Input interface
115 Display controller
116 Data reader/writer
117 Communication interface
118 Input equipment
119 Display device
120 Recording medium
121 Bus

What is claimed is:

1. An activity support apparatus that supports an activity of a worker at a disaster site, the activity support apparatus comprising:

a vibration data acquisition unit that acquires vibration data of vibrations generated by the worker;

an activity level estimation unit that estimates an activity level of the worker based on a feature amount of the vibration data acquired; and a notification unit that notifies the activity level estimated, wherein the feature amount of the vibration data includes at least one of a magnitude of a vibration amplitude of the vibration data or a time variation of the vibration amplitude of the vibration data.

2. The activity support apparatus according to claim 1, further comprising:

a surrounding situation acquisition unit that acquires a surrounding situation of the worker, and a maximum time calculation unit that calculates a maximum time that the worker is allowed to work at the disaster site from the surrounding situation, wherein the notification unit notifies the maximum time and the activity level.

3. The activity support apparatus according to claim 2, wherein the surrounding situation acquisition unit acquires a temperature around the worker as the surrounding situation, the maximum time calculation unit calculates the maximum time from the temperature acquired.

4. The activity support apparatus according to claim 3, further comprising:

a time determination unit that determines whether the surrounding situation acquisition unit continues to acquire a temperature equal to or higher than a temperature used to calculate the maximum time for a period longer than the maximum time, and an activity risk calculation unit that calculates an activity risk based on a result of a determination, wherein the notification unit notifies the activity risk.

5. The activity support apparatus according to claim 3, further comprising:

an activity determination unit that determines whether the worker is performing a normal activity from the activity level and the activity risk, wherein the notification unit notifies a determination result of the normal activity.

6. An activity support method that supports an activity of a worker at a disaster site, the activity support method comprising:

acquiring vibration data of vibrations generated by the worker, estimating an activity level of the worker based on a feature amount of the vibration data acquired, and notifying the activity level estimated, wherein the feature amount of the vibration data includes at least one of a magnitude of vibration amplitude or a time variation of the vibration amplitude.

7. The activity support method according to claim 6, further comprising:

acquiring a surrounding situation of the worker, and calculating a maximum time that the worker is allowed to work at the disaster site from the surrounding situation, wherein when notifying the activity level, notifying the maximum time and the activity level.

8. The activity support method according to claim 7, wherein when acquiring the surrounding situation, acquiring a temperature around the worker as the surrounding situation, and when calculating the maximum time, calculating the maximum time from the temperature acquired.

9. The activity support method according to claim 8, further comprising:

determining whether a temperature equal to or higher than a temperature used to calculate the maximum time continues to be acquired for a period longer than the maximum time, and calculating an activity risk based on a result of a determination, wherein when notifying the activity level, notifying the activity risk.

10. The activity support method according to claim 8, further comprising:

determining whether the worker is performing a normal activity from the activity level and the activity risk, wherein when notifying the activity level, notifying a determination result of the normal activity.

11. A non-transitory computer-readable recording medium that includes a program, which allows a computer to support an activity of a worker at a disaster site, recorded thereon, the program including instructions that cause a computer to execute:

acquiring vibration data of vibrations generated by the worker, estimating an activity level of the worker based on a feature amount of the vibration data acquired, and notifying the activity level estimated, wherein the feature amount of the vibration data includes at least one of a magnitude of vibration amplitude or a time variation of the vibration amplitude.

12. The non-transitory computer-readable recording medium according to claim 11, the program further including instructions that cause a computer to execute:

acquiring a surrounding situation of the worker, and calculating a maximum time that the worker is allowed to work at the disaster site from the surrounding situation, wherein when notifying the activity level, notifying the maximum time and the activity level.

13. The non-transitory computer-readable recording medium according to claim 12, wherein when acquiring the surrounding situation, acquiring a temperature around the worker as the surrounding situation, and when calculating the maximum time, calculating the maximum time from the temperature acquired.

14. The non-transitory computer-readable recording medium according to claim 13, the program further including instructions that cause a computer to execute:

determining whether a temperature equal to or higher than a temperature used to calculate the maximum time continues to be acquired for a period longer than the maximum time, and calculating an activity risk based on a result of a determination, wherein when notifying the activity level, notifying the activity risk.

15. The non-transitory computer-readable recording medium according to claim 13, the program further including instructions that cause a computer to execute:

determining whether the worker is performing a normal activity from the activity level and the activity risk, wherein when notifying the activity level, notifying a determination result of the normal activity.

* * * * *